United States Patent
Sharma et al.

(10) Patent No.: US 11,219,077 B2
(45) Date of Patent: Jan. 4, 2022

(54) METHOD AND APPARATUS FOR COORDINATION OF RRC CONFIGURATIONS BETWEEN INTERWORKING NODES IN DUAL CONNECTIVITY

(71) Applicant: Samsung Electronics Co., Ltd, Suwon-si (KR)

(72) Inventors: Neha Sharma, Bangalore (IN); Hyunjeong Kang, Seoul (KR); Pravjyot Singh Deogun, Bangalore (IN); Rajavelsamy Rajadurai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/611,207

(22) PCT Filed: May 4, 2018

(86) PCT No.: PCT/KR2018/005188
§ 371 (c)(1),
(2) Date: Nov. 5, 2019

(87) PCT Pub. No.: WO2018/203702
PCT Pub. Date: Nov. 8, 2018

(65) Prior Publication Data
US 2020/0178332 A1 Jun. 4, 2020

(30) Foreign Application Priority Data

May 5, 2017 (IN) .............................. 201741015974
May 2, 2018 (IN) .............................. 201741015974

(51) Int. Cl.
*H04W 4/00* (2018.01)
*H04W 76/15* (2018.01)
(Continued)

(52) U.S. Cl.
CPC ....... *H04W 76/15* (2018.02); *H04W 36/0069* (2018.08); *H04W 76/19* (2018.02);
(Continued)

(58) Field of Classification Search
CPC ..... H04W 76/27; H04W 76/19; H04W 76/15; H04W 80/08; H04W 36/0069; H04W 88/06; H04W 76/20
(Continued)

(56) References Cited

U.S. PATENT DOCUMENTS

2015/0215826 A1   7/2015  Yamada
2015/0351139 A1*  12/2015 Zhang .................. H04W 48/10
                                                      370/329
(Continued)

FOREIGN PATENT DOCUMENTS

EP       2922363 A1      9/2015
WO    2015/037926 A1     3/2015
WO    2017/022167 A1     2/2017

OTHER PUBLICATIONS

"3rd Generation Partnership Project; Technical Specification Group Radio Access Network; Study on New Radio Access Technology; Radio Interface Protocol Aspects (Release 14)", 3GPP TR 38.804 V14.0.0 (Mar. 2017), 57 pages.

(Continued)

*Primary Examiner* — Huy C Ho

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The embodiments herein relate to wireless communication system and more particularly relates to a method for coordination of Radio Resource Control (RRC) configurations between interworking nodes in dual connectivity in wireless (Continued)

communication system. The method includes determining, by a secondary node, whether a signaling radio bearer (SRB) of a secondary node is pre-configured in a secondary cell group (SCG), deciding, by the secondary node, to perform secondary node modification to a user equipment (UE) in response to determining that the SRB of the secondary node is pre-configured, transmitting, by the secondary node, a RRC connection reconfiguration message to the UE without coordinating with a master node and receiving, by the secondary node, a RRC connection reconfiguration complete message from the UE.

13 Claims, 6 Drawing Sheets

(51) Int. Cl.
  *H04W 76/19* (2018.01)
  *H04W 76/27* (2018.01)
  *H04W 36/00* (2009.01)
  *H04W 80/08* (2009.01)
  *H04W 88/06* (2009.01)
(52) U.S. Cl.
  CPC ........... *H04W 76/27* (2018.02); *H04W 80/08* (2013.01); *H04W 88/06* (2013.01)
(58) Field of Classification Search
  USPC ........................................................ 370/329
  See application file for complete search history.

(56) References Cited

U.S. PATENT DOCUMENTS

| | | | |
|---|---|---|---|
| 2016/0044639 A1* | 2/2016 | Yi | H04L 47/624 |
| | | | 370/329 |
| 2018/0199245 A1* | 7/2018 | Futaki | H04W 72/04 |

OTHER PUBLICATIONS

"3rd Generation Partnership Project; Technical Specification Group Radio Access Network; Evolved Universal Terrestrial Radio Access (E-UTRA); Layer 2—Measurements (Release 14)", 3GPP TS 36.314 V14.0.0 (Mar. 2017), 23 pages.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.0.0 (Dec. 2017), 776 pages.
"3rd Generation Partnership Project; Technical Specification Group Radio Access Network; Evolved Universal Terrestrial Radio Access Network (E-UTRAN); X2 application protocol (X2AP) (Release 15)", 3GPP TS 36.423 V15.1.0 (Mar. 2018), 354 pages.
"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 14)", 3GPP TS 37.320 V14.0.0 (Mar. 2017), 26 pages.
"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.0.0 (Dec. 2017), 51 pages.
"3rd Generation Partnership Project; Technical Specification Group Radio Access Network; NR; User Equipment (UE) procedures in idle mode and RRC Inactive state (Release 15)", 3GPP TS 38.304 V15.0.0 (Jun. 2018), 25 pages.
"3rd Generation Partnership Project; Technical Specification Group Radio Access Network NR Radio Resource Control (RRC) protocol specification (Release 15)", 3GPP TS 38.331 V15.0.0 (Dec. 2017), 188 pages.
Ericsson, "SeNB to MeNB reconfiguration for NR dual-connectivity", 3GPP TSG-RAN WG2 #97, Feb. 3-7, 2017, Tdoc r2-1702703, 3 pages.
LG Electronics Inc., "RRC Connection Reconfiguration with Connection Inactivation", 3GPP TSG-RAN WG2 #97bis, Apr. 3-7, 2017, R2-1703324, 3 pages.
Ericsson, "TP for RRCConnectionReconfiguration", 3GPP TSG-RAN WG2 #99bis, Oct. 9-13, 2017, Tdoc R2-1711967, 34 pages.
International Search Report dated Aug. 16, 2018 in connection with International Patent Application No. PCT/KR2018/005188, 3 pages.
Written Opinion of the International Searching Authority dated Aug. 16, 2018 in connection with International Patent Application No. PCT/KR2018/005188, 8 pages.
Supplementary Partial European Search Report dated Apr. 23, 2020 in connection with European Patent Application No. 18 79 4245, 12 pages.
Supplementary European Search Report dated Aug. 12, 2020 in connection with European Patent Application No. 18 79 4245, 13 pages.
Intellectualproperty India, "Examination report under sections 12 & 13 of the Patents Act, 1970 and the Patents Rules, 2003" dated Feb. 2, 2021, in connection with Indian Application No. 201741015974, 7 pages.

* cited by examiner

[Fig. 1]
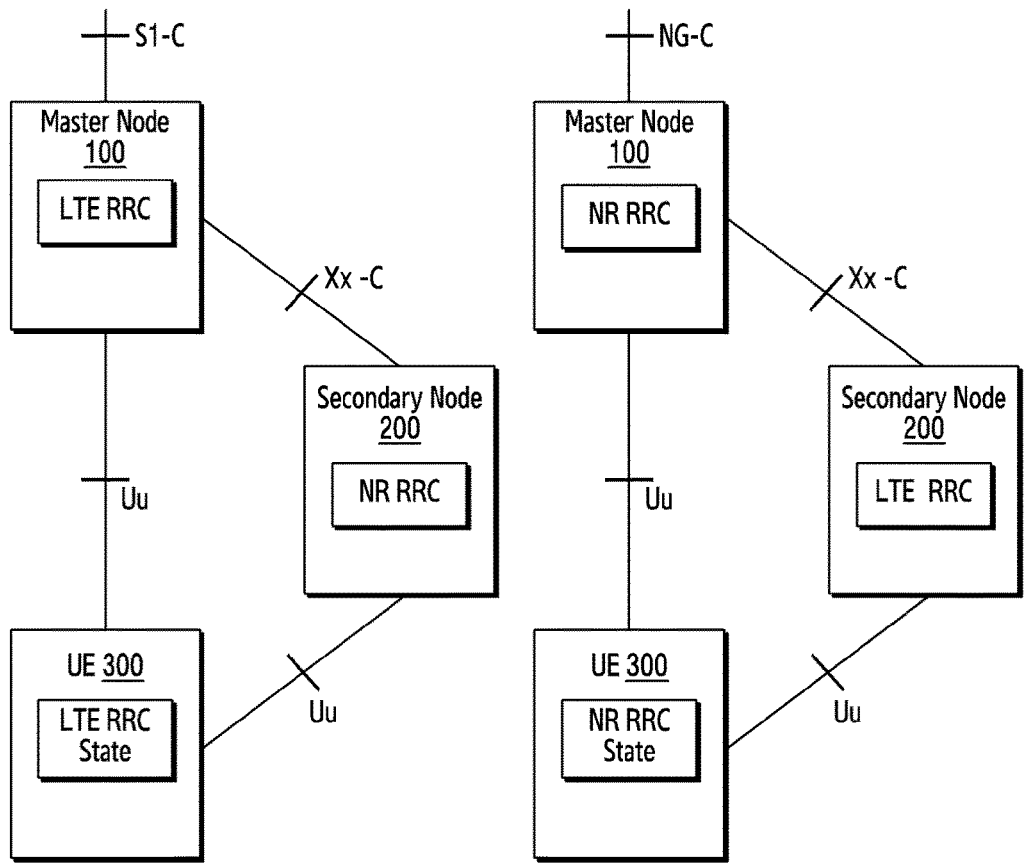
[Fig. 2]
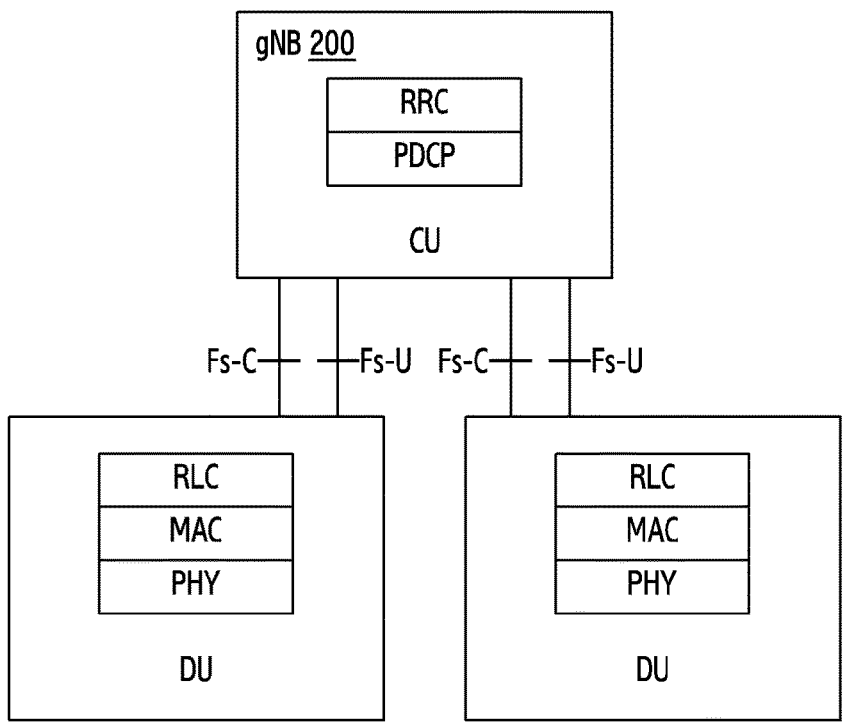

[Fig. 3]
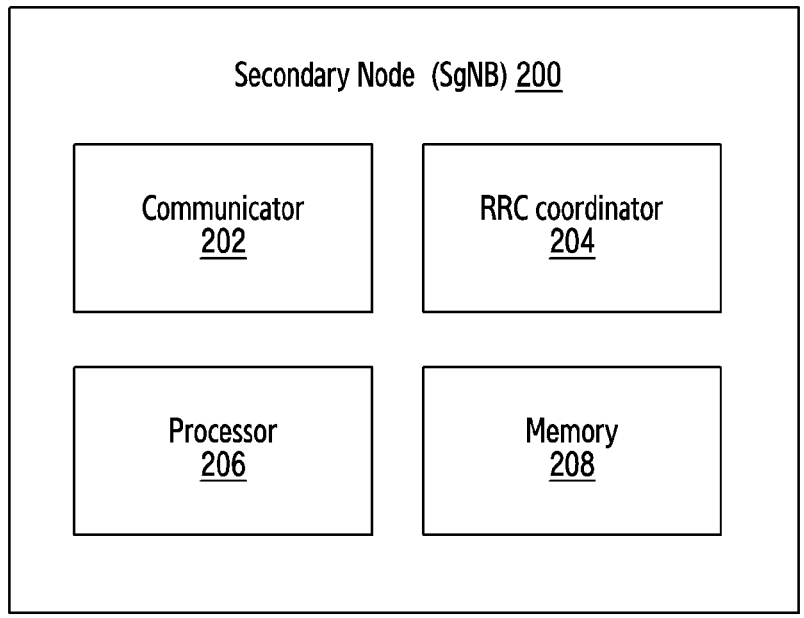
[Fig. 4]
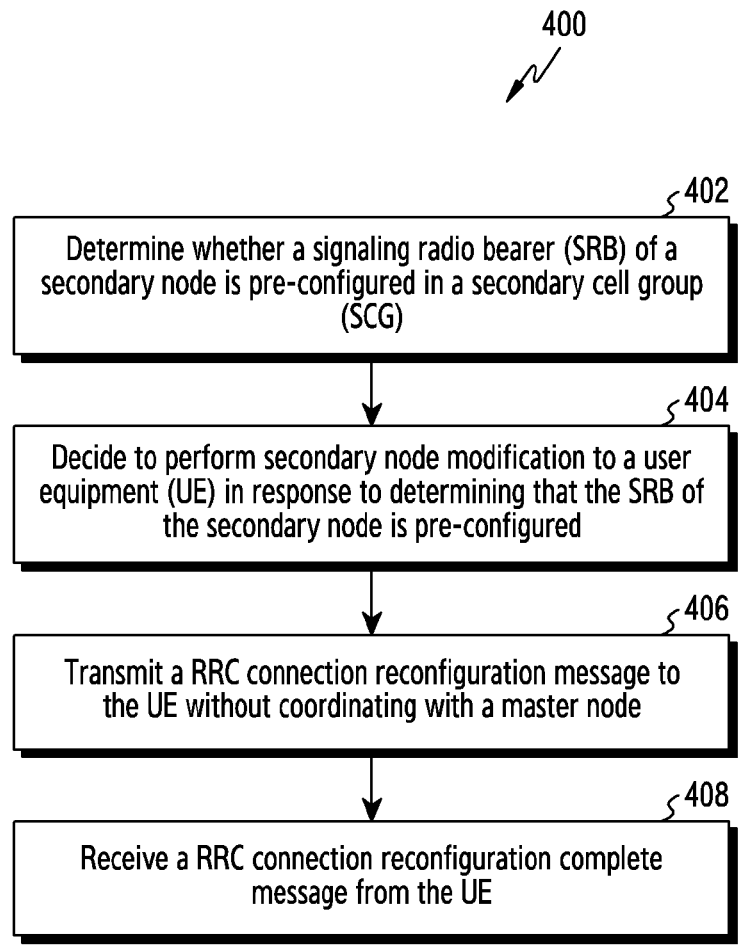

[Fig. 5]
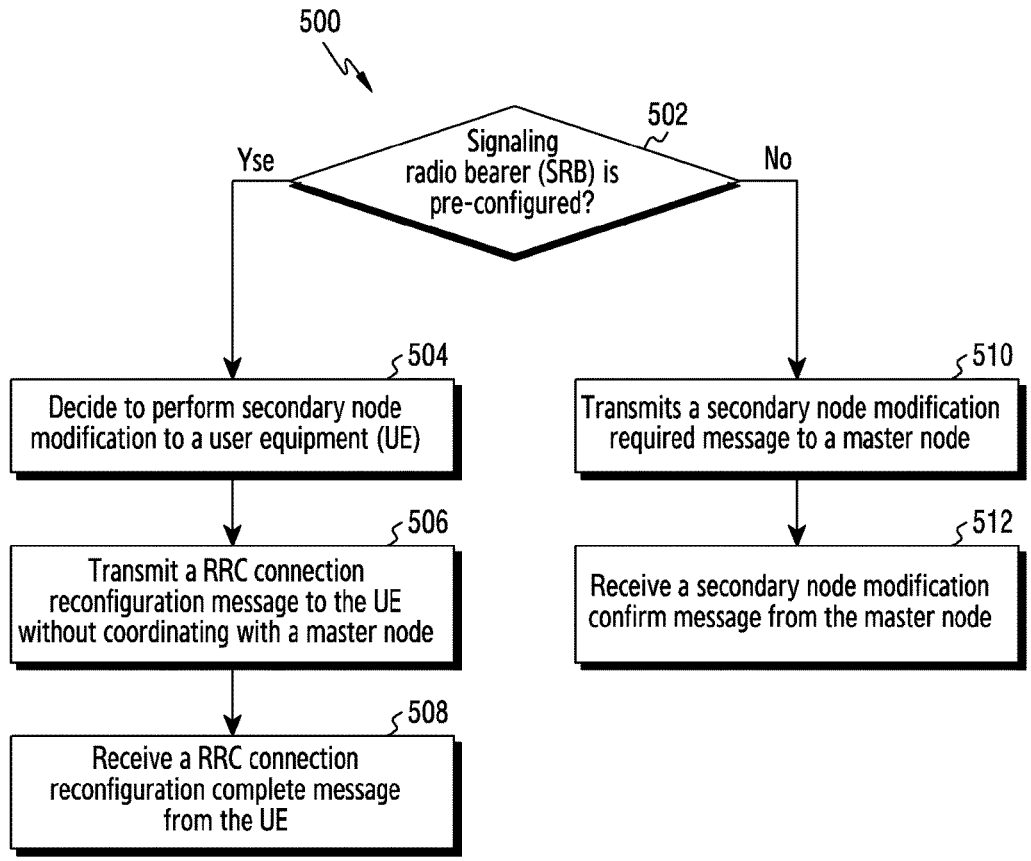
[Fig. 6]
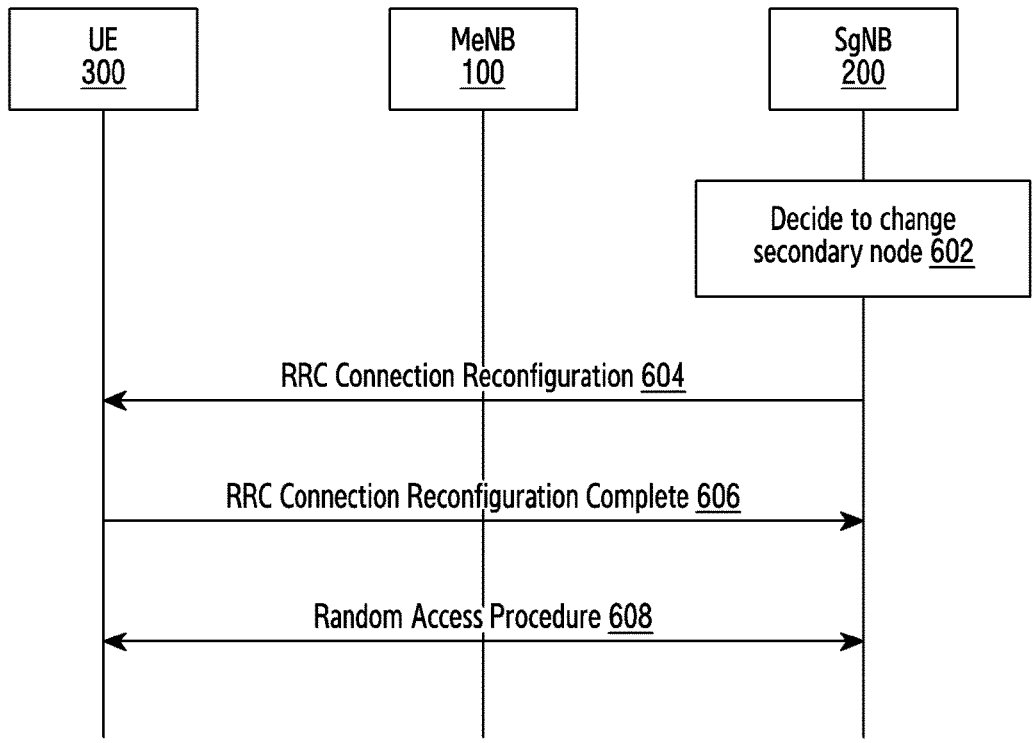

[Fig. 7]
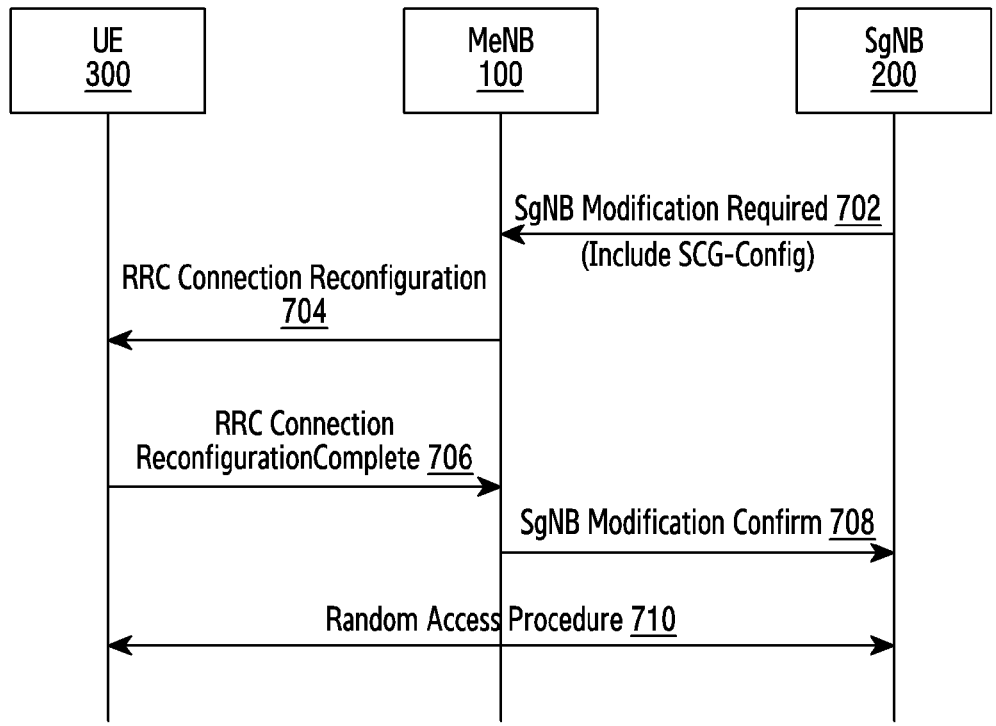
[Fig. 8]
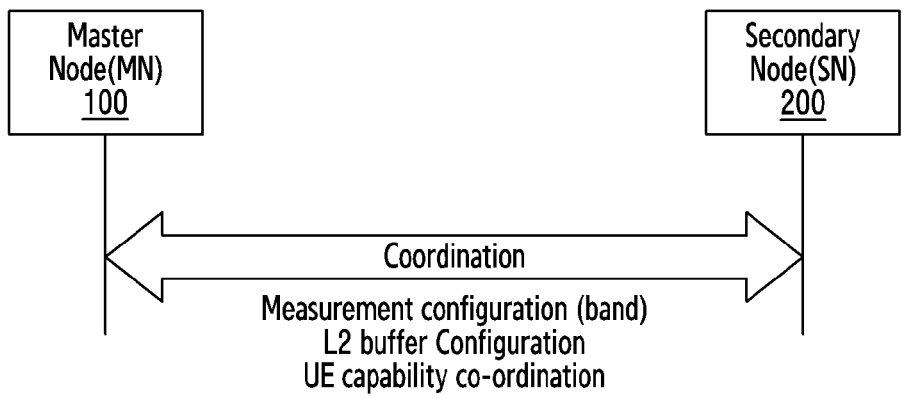

[Fig. 9]
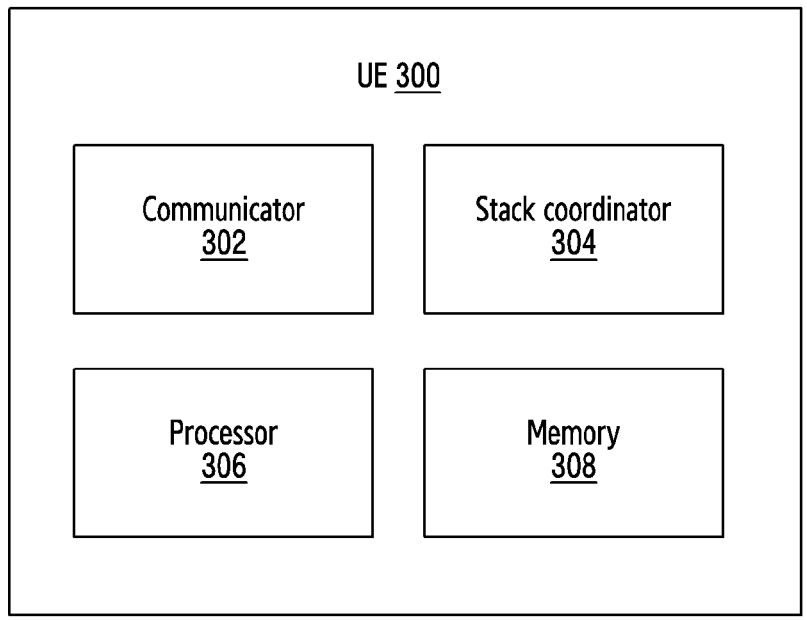
[Fig. 10]
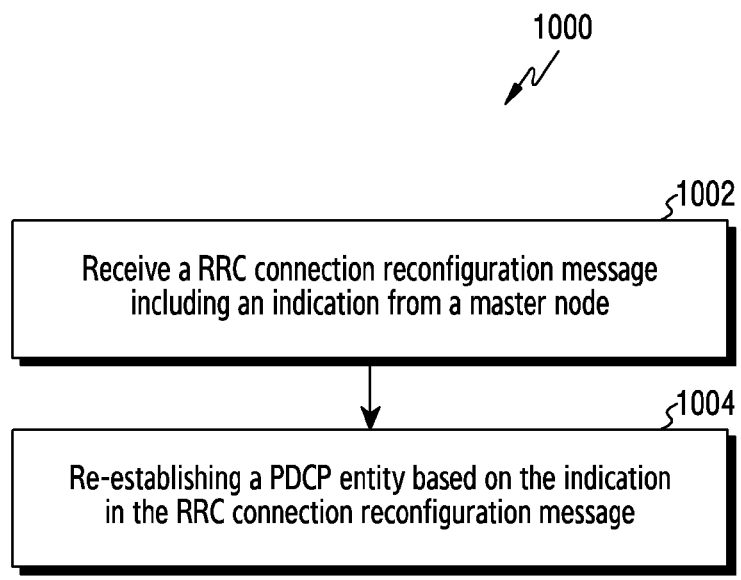

[Fig. 11]
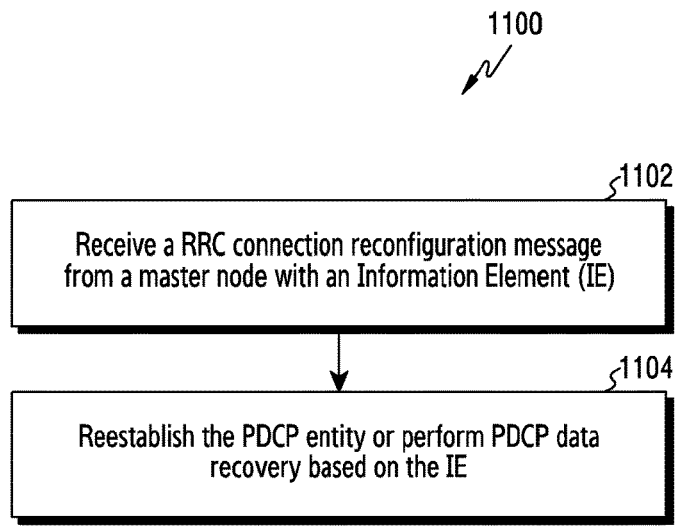
[Fig. 12]
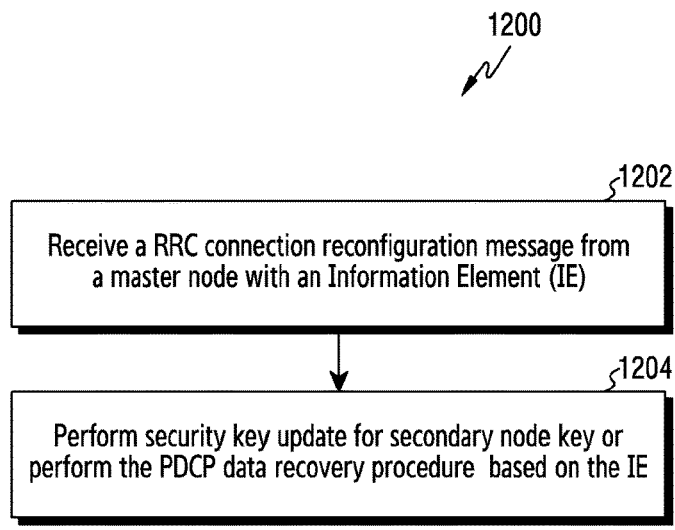
[Fig. 13]
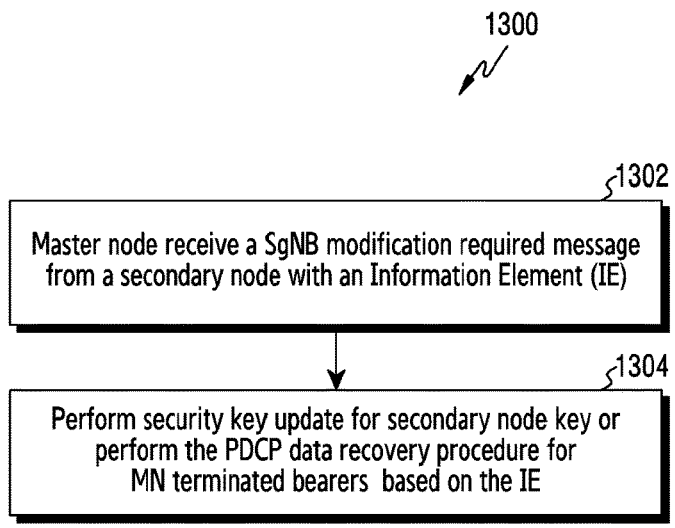

METHOD AND APPARATUS FOR COORDINATION OF RRC CONFIGURATIONS BETWEEN INTERWORKING NODES IN DUAL CONNECTIVITY

CROSS-REFERENCE TO RELATED APPLICATIONS

This application is a 371 of International Application No. PCT/KR2018/005188 filed on May 4, 2018, which claims priority to India Patent Application No. 201741015974 filed on May 5, 2017 and India Patent Application No. 201741015974 filed on May 2, 2018, the disclosures of which are herein incorporated by reference in their entirety.

BACKGROUND

1. Field

The embodiments herein relate to wireless communication system and more particularly relates to a method for coordination of Radio Resource Control (RRC) configurations between interworking nodes in dual connectivity in wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In wireless communication system, dual connectivity (DC) refers to the operation of a user equipment (UE), such as a smart phone, a tablet, and/or the like, configured to use the radio resources provided by two distinct resource schedulers that are located in two base stations. The evolved Node B base station that is in DC with a given UE may act as a master evolved Node B (MeNB) base station or as a secondary evolved Node B (SeNB) base station. While in dual connectivity, the UE may be connected to a single MeNB and a single SeNB or a MeNB and a SgNb. In the case of E-UTRAN, there may be provided dual connectivity that supports Long Term Evolution (LTE)-Wireless Local Area network (WLAN) aggregation (LWA). When in dual connectivity, the base stations, such as the MeNB and SeNB or SgNB, may use the same or different radio access technologies.

As mentioned in 3GPP TS 38.804, in the dual connectivity between LTE and New Radio (NR), the secondary node owns its radio resources and is responsible for allocating radio resources of its cells. To enable this, coordination is required between a master node and the secondary node irrespective of whether the master node is LTE node and the secondary node is NR, or vice versa. When the DC between LTE and NR is configured for a UE, the UE has a single RRC state machine based on the master node RAT. In this operation, single C-plane connection is established towards CN. With these principles, the FIG. 1 illustrates the C-plane architectures for DC between LTE and NR. Each node has its own RRC entity, which can generate RRC PDUs and inter-node PDUs using ASN.1. RRC PDUs and inter-node PDUs generated by the secondary node 200 are embedded with RRC PDUs generated by the master node 100 which are transported via the master node 100 to the UE 300 for the first configuration, and for the secondary node RRC reconfiguration requiring the master node 100 RRC reconfiguration and vice versa. The master node 100 need not modify or add the UE configurations for the secondary node 200. The UE 300 can be configured to establish an SRB in SCG to enable RRC PDUs for the secondary node 200 to be sent directly between the UE and the secondary node. RRC PDUs for the secondary node 200 can be transported directly to the UE 300 for the secondary node RRC reconfiguration not requiring any coordination with the master node. Alternatively, it can be delivered embedded within RRC PDUs generated by the master node, which is up to the network implementation. Measurement reporting for mobility within the secondary node can be done directly from the UE 300 to the secondary node 200 if an SCG SRB is configured. Support of the direct RRC PDU transmission between the UE and the secondary node does not imply that the UE has to do any reordering of RRC messages.

Split SRB is supported for DC between LTE and NR no matter which RAT is the master. In other words, C-plane packet duplication is supported in LTE/NR PDCP.

Due to the introduction for split SRB and SCG SRB there is impact on signaling procedure between master node (MN) and secondary node (SN) during handover procedure or Modification procedure of SN. Also as there is no need to perform co-ordination between master node and secondary node for each configuration, there will be impact on signaling procedure initiated by master node or secondary node.

The 3GPP specification TS 38.801 defined the NR centralized deployment architecture. Different protocol split options between a central unit and lower layers of gNB nodes may be possible. The functional split between the central unit and lower layers of gNB nodes may depend on the transport layer.

High performance transport between the central unit and lower layers of gNB nodes, e.g. optical networks, can enable advanced CoMP schemes and scheduling optimization, which could be useful in high capacity scenarios, or scenarios where cross cell coordination is beneficial.

Low performance transport between the Central Unit and lower layers of gNB nodes can enable the higher protocol layers of the NR radio stacks to be supported in the Central Unit, since the higher protocol layers have lower performance requirements on the transport layer in terms of bandwidth, delay, synchronization and jitter.

In NR, centralized deployment systems have been introduced which consist of a central unit (CU), a distributed unit (DU), and TRPs (Transmission Reception Point) nodes. gNodeB (gNB) comprise of one or more of these nodes. One gNB can comprise of one CU, one or multiple DU or one or multiple TRPs as shown in FIG. 2. There are multiple possibilities of deployment of centralized systems in the NR system.

In an example deployment, where the gNB comprise of 1 CU with multiple DUs and multiple TRPs. Due to these different nodes, multiple types of mobility procedures are possible such as Intra DU-Intra TRP Mobility (Beam Change), Intra DU-Inter TRP Mobility (TRP Change), Inter DU Mobility (DU change), and so on.

Due to various possible mobility procedure during intra and inter CU Handover (HO), there is impact on control and data plane procedure as current system is not capable to handle these new mobility types.

The above information is presented as background information only to help the reader to understand the present invention. Applicants have made no determination and make no assertion as to whether any of the above might be applicable as Prior Art with regard to the present application.

SUMMARY

The principal object of the embodiments herein is to provide a method for coordination of Radio Resource Control (RRC) configurations between interworking nodes in dual connectivity in a wireless communication system.

Another object of the embodiments herein is to provide a method for transmitting a RRC connection reconfiguration message to the UE without coordinating with a master node when a signaling radio bearer (SRB) of a secondary node is pre-configured in a secondary cell group (SCG).

Another object of the embodiments herein is to provide a method for transmitting a secondary node modification required message to a master node when the SRB of the secondary node is not pre-configured.

Another object of the embodiments herein is to provide a method for handling packet data convergence protocol (PDCP) re-establishment during a handover, by a User Equipment (UE) in a wireless communication system.

Another object of the embodiments herein is to provide a method in which the secondary node coordinates with the master node for at least one of measurement configuration of the UE, band combination layer 2 (L2) buffer configuration and UE capability information.

Another object of the invention is to discuss the impacts on Layer 2 entities due to intra and inter handover procedure in 5G networks or New RAT (NR).

Another object of the invention is to provide a method for handling of Layer2 impacts through RRC message due to intra and inter handover procedure in 5G networks or New RAT (NR).

Another object of the embodiments herein is to provide PDCP data recovery procedure due to intra and inter handover procedure in 5G networks or New RAT (NR).

Another object of the embodiments herein is to provide a signaling procedure between Master node and Secondary node due to intra and inter handover procedure in 5G networks or New RAT (NR).

Accordingly the embodiments herein provide a method for coordination of Radio Resource Control (RRC) configurations between interworking nodes in dual connectivity in a wireless communication system. The method includes determining, by a secondary node, whether a signaling radio bearer (SRB) of a secondary node is pre-configured in a secondary cell group (SCG). The method includes deciding, by the secondary node, to perform secondary node modification to a user equipment (UE) in response to determining that the SRB of the secondary node is pre-configured. The method includes transmitting, by the secondary node, a RRC connection reconfiguration message to the UE without coordinating with a master node. Further, the method includes receiving, by the secondary node, a RRC connection reconfiguration complete message from the UE.

Accordingly the embodiments herein provide a method for handling packet data convergence protocol (PDCP) re-establishment during a handover, by a User Equipment (UE), in a wireless communication system. The method includes receiving a RRC connection reconfiguration message including an indication from a base station. Further, the method includes re-establishing a PDCP entity based on the indication in the RRC connection reconfiguration message.

Accordingly the embodiments herein provide a Radio Access Network (RAN) node for coordination of Radio Resource Control (RRC) configurations in dual connectivity in a wireless communication system, the RAN node comprising a Radio Resource Control (RRC) coordinator configured to determine whether a signaling radio bearer (SRB) of the secondary node is pre-configured in a secondary cell group (SCG). The Radio Resource Control (RRC) coordinator configured to decide to perform secondary node modification to a user equipment (UE) in response to determining that the SRB of the secondary node is pre-configured. The RRC coordinator configured to transmit a RRC connection reconfiguration message to the UE without coordinating with a master node. Further, the RRC coordinator configured to receive a RRC connection reconfiguration complete message from the UE.

Accordingly the embodiments herein provide a method for coordination of Radio Resource Control (RRC) configurations between interworking nodes in dual connectivity in a wireless communication system. The method includes determining, by a secondary node or master node when master node and secondary node should coordinate with each other before sending the RRC configuration to the UE.

Accordingly the embodiments herein provide a method for handling packet data convergence protocol (PDCP) re-establishment or data recovery during a handover or other scenario, by a User Equipment (UE), in a wireless communication system. The method includes sharing the information between master node and secondary node over Xx or Xn or X2 interface. On receiving the same, master node includes the indication in RRC connection reconfiguration message from a base station. Further, the method includes re-establishing a PDCP entity based on the indication in the RRC connection reconfiguration message.

Accordingly the embodiments herein provide a User Equipment (UE) for handling packet data convergence protocol (PDCP) re-establishment during a handover, the UE comprises a Stack Coordinator (SC) unit configured to receive a RRC connection reconfiguration message including an indication from a base station. The SC unit configured to re-establish a PDCP entity based on the indication in the RRC connection reconfiguration message.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 1 illustrates the C-plane architectures for dual connectivity between Long Term Evolution and New Radio (NR), according to prior art FIG. 2 illustrates functional split between Central Unit (CU) and Distributed Unit in a NR base station, according to prior art;

FIG. 3 illustrates various hardware components of a secondary Node (SN) for coordinating Radio Resource Control (RRC) configurations between interworking nodes in dual connectivity, according to an embodiment as disclosed herein;

FIG. 4 is a flow chart illustrating a method for coordination of Radio Resource Control (RRC) configurations between interworking nodes in dual connectivity, according to an embodiment as disclosed herein;

FIG. 5 is a flow chart illustrating a method for coordination of RRC configurations between interworking nodes in dual connectivity based on configuration of signaling radio bearer (SRB) in secondary cell group (SCG), according to an embodiment as disclosed herein;

FIG. 6 is a sequence diagram illustrating various signaling messages in which the secondary node transmits a RRC connection reconfiguration message to the UE without coordinating with a master node, according to an embodiment as disclosed herein;

FIG. 7 is a sequence diagram illustrating various signaling messages in which secondary node transmits a secondary node modification required message to a master node for RRC reconfiguration to the UE, according to an embodiment as disclosed herein;

FIG. 8 illustrates scenarios in which the secondary node coordinates with master node, according to an embodiment as disclosed herein;

FIG. 9 illustrates various hardware components of a User Equipment (UE) for handling packet data convergence protocol (PDCP) re-establishment during a handover, according to an embodiment as disclosed herein;

FIG. 10 is a flow chart illustrating a method for handling packet data convergence protocol (PDCP) re-establishment during a handover by the UE, according to an embodiment as disclosed herein; and FIG. 11 is a flow chart illustrating a method for reestablishing the PDCP based on an Information Element (IE) received in a RRC message from a master node, according to an embodiment as disclosed herein;

FIG. 12 is a flow chart illustrating a method for performing security key update for secondary node key, according to an embodiment as disclosed herein; and FIG. 13 is a flow chart illustrating a method for performing security key update for secondary node key or PDCP data recovery, according to an embodiment as disclosed herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Throughout the description, the term master node denotes a Long Term Evolution (LTE) node (i.e., MeNB) and a secondary node denotes a New Radio (NR) node (i.e., a 5G base station (gNB)).

In some embodiments, the master node can be a 5G base station (i.e., MgNB) and secondary node can be (SeNB) for dual connectivity as described in this disclosure.

The embodiments herein provide a method for coordination of Radio Resource Control (RRC) configurations between interworking nodes in dual connectivity in a wireless communication system. The method includes determining, by a secondary node, whether a signaling radio bearer (SRB) of a secondary node is pre-configured in a secondary cell group (SCG). The method includes deciding, by the secondary node, to perform secondary node modification to a user equipment (UE) in response to determining that the SRB of the secondary node is pre-configured. The method includes transmitting, by the secondary node, a RRC connection reconfiguration message to the UE without coordinating with a master node. Further, the method includes receiving, by the secondary node, a RRC connection reconfiguration complete message from the UE In an embodiment, the secondary node transmits a secondary node modification required message to a master node in response to determining that the SRB of the secondary node is not pre-configured.

In an embodiment, the secondary node receives a secondary node modification confirm message from the master node, after performing the RRC connection reconfiguration to the UE by the master node.

In an embodiment, the secondary node receives the secondary node modification confirm message from the master node, without coordination of a secondary node modification request message and a secondary node modification request acknowledgement message with the master node.

In an embodiment, the secondary node transmits a secondary node modification required message to a master node in response to determining that coordination is required with master node, wherein the secondary node coordinates with the master node for at least one of measurement configuration of the UE, band combination layer 2 (L2) buffer configuration and UE capability information.

In an embodiment, the secondary node receives a secondary node modification confirm message from the master node, after performing the RRC connection reconfiguration to the UE by the master node.

Unlike to the conventional system, the secondary node transmits the RRC connection reconfiguration message to the UE without coordinating with the master node.

Further, the secondary node receives the secondary node modification confirm message from the master node, without coordination of a secondary node modification request message and a secondary node modification request acknowledgement message with the master node 100.

Embodiments herein provide control and data plane procedure due to intra and inter handover procedure in 5G networks, i.e., New RAT (NR). Further, the embodiments herein also provide signaling procedures for LTE and NR systems during LTE-NR interworking with the introduction of SCG and SRB during secondary node modification to the UE.

The embodiments disclosed herein are applicable for standalone system or Non-standalone system i.e., LTE-NR interworking or NR-NR dual connectivity procedure.

Referring now to the drawings, and more particularly to FIGS. 3 through 13, where similar reference characters denote corresponding features consistently throughout the figures, there are shown preferred embodiments.

FIG. 3 illustrates various hardware components of a secondary Node (SN) for coordinating Radio Resource Control (RRC) configurations between interworking nodes in dual connectivity, according to an embodiment as disclosed herein. As depicted in the FIG. 3, the SN 200 includes a communicator 202, a RRC coordinator 204, a processor 206 and memory 208.

In an embodiment, the communicator 202 can be configured to communicate one or more signaling messages or RRC messages to the UE 300 and the master node 100. The communicator 202 receives one or more indications from RRC coordinator 204 for transmitting the one or more signaling messages or RRC messages to the UE 300 and the master node 100.

In an embodiment, the RRC coordinator 204 can be configured to control coordination of RRC configurations to the UE 300. The RRC coordinator 204 can be configured to determine whether the SRB of the secondary node 200 is pre-configured in the SCG and decide whether coordination is required with master node 100. Further, the RRC coordinator 204 can be configured to decide to perform secondary node modification to the UE 300 when the SRB of the secondary node 200 is pre-configured in the SCG. The RRC coordinator 204 can be configured to transmit a RRC connection reconfiguration message to the UE 300 without coordinating with the master node 100 through the communicator 202. The RRC coordinator 204 can be configured to receive a RRC connection reconfiguration complete message from the UE 300.

In another embodiment, the RRC coordinator 204 can be configured to transmit a secondary node modification required message to the master node 100 when the SRB of the secondary node is not pre-configured in the SCG. The RRC coordinator 204 can be configured to receive secondary node modification confirm message from the master node 100, without coordination of a secondary node 200 modification request message and a secondary node 200 modification request acknowledgement message with the master node 100.

In another embodiment, the RRC coordinator 204 is configured to coordinate with the master node for at least one of indicating measurement configuration of the UE 300, band combination layer 2 (L2) buffer configuration, mobility control info for secondary cells, radio resource configuration on secondary node cells and capability information of the UE 300.

In another embodiment, the RRC coordinator 204 is configured to coordinate with the master node for at least one of indicating security key update for secondary node or PDCP recovery indication for master node during secondary node 200 change procedure.

In an embodiment, the processor 206 (for example; a hardware unit, an apparatus, a Central Processing Unit (CPU), a Graphics Processing Unit (GPU), etc.,) communicatively coupled to a memory 208 (e.g., a volatile memory and/or a non-volatile memory); the memory 208 includes storage locations configured to be addressable through the processor 206.

In an embodiment, the memory 208 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 208 may, in some examples, be considered a non-transitory storage medium. The term "non-transitory" may indicate that the storage medium is not embodied in a carrier wave or a propagated signal. However, the term "non-transitory" should not be interpreted that the memory 408 is non-movable. In some examples, the memory 208 can be configured to store larger amounts of information than the memory. In certain examples, a non-transitory storage medium may store data that can, over time, change (e.g., in Random Access Memory (RAM) or cache).

FIG. 4 is a flow chart 400 illustrating a method for coordination of Radio Resource Control (RRC) configurations between interworking nodes in dual connectivity, according to an embodiment as disclosed herein. The various steps of the flow diagram 400 are performed by the RRC coordinator 204 in the secondary node 200.

At step 402, the method includes determining whether the SRB of the secondary node 200 is pre-configured in the SCG.

At step 404, the method includes deciding to perform secondary node modification to the UE 300 in response to determining that the SRB of the secondary node 200 is pre-configured.

At step 406, the method includes transmitting a RRC connection reconfiguration message to the UE 300 without coordinating with the master node 100.

At step 408, the method includes receiving a RRC connection reconfiguration complete message from the UE 300.

FIG. 5 is a flow chart 500 illustrating a method for coordination of RRC configurations between interworking nodes in dual connectivity based on configuration of signaling radio bearer (SRB) in secondary cell group (SCG), according to an embodiment as disclosed herein. The various steps of the flow chart 500 are performed by the RRC coordinator 204 in the secondary node 200.

At step 502, the method includes determining whether the SRB of the secondary node 200 is pre-configured in the SCG. In case when the SRB of the secondary node 200 is pre-configured in the SCG, at step 504, the method includes deciding to perform secondary node modification to the UE 300 in response to determining that the SRB of the secondary node 200 is pre-configured.

At step 506, the method includes transmitting a RRC connection reconfiguration message to the UE 300 without coordinating with the master node 100.

At step 508, the method includes receiving a RRC connection reconfiguration complete message from the UE 300.

In case, at step 502, it is determined that the SRB of the secondary node 200 is not pre-configured in the SCG, then at step 510, the method includes transmitting a secondary node modification required message to the master node 100. At step 512, the method includes receiving a secondary node modification confirm message from the master node 100. The secondary node 200 receives the secondary node modification confirm message from the master node 100 when the master node 100 performs the RRC connection reconfiguration to the UE 300.

Unlike to the conventional system, at step 512, the secondary node 200 receives the secondary node modification confirm message from the master node 100, without coordination of a secondary node modification request message and a secondary node modification request acknowledgement message with the master node 100.

FIG. 6 is a sequence diagram illustrating various signaling messages in which the secondary node transmits a RRC connection reconfiguration message to the UE without coordinating with a master node, according to an embodiment as disclosed herein. As depicted in the FIG. 6, the secondary node 200 decides (602) to perform the secondary node modification to the UE 300 when the SRB of the secondary node 200 is pre-configured in the SCG. When the secondary node 102 decides for the secondary node modification to the UE 300, the secondary node 102 transmits (604) a RRC connection reconfiguration message to the UE 300 without coordinating with the master node 100 as shown in the FIG. 6.

Further, the secondary node 200 receives (606) a RRC connection reconfiguration complete message from the UE 300 after transmitting the RRC connection reconfiguration message to the UE 300. The UE 300 performs (608) random access procedure with the secondary node 200 as shown in the FIG. 6.

FIG. 7 is a sequence diagram illustrating various signaling messages in which secondary node transmits a secondary node modification required message to a master node for RRC reconfiguration to the UE, according to an embodiment as disclosed herein.

FIG. 7 is a sequence diagram illustrating various signaling messages in which secondary node transmits a secondary node modification required message to a master node for RRC reconfiguration to the UE, according to an embodiment as disclosed herein.

SgNB initiated SgNB Modification. In this case, the NW has not configured SCG/split SRB and hence the secondary node 200 cannot directly transfer the message to the UE 300 and it needs to send the signaling message through MeNB via MCG SRB. As depicted in the FIG. 7, the secondary node 200 transmits (702) a secondary node (SgNB) modification required message to the master node 100. When the master node 100 receives the secondary node modification required message from the secondary node 200, the master node 100 transmits (704) a RRC connection reconfiguration message to the UE 300. Further, the master node 100 receives (706) a RRC connection reconfiguration complete message from the UE 300 in response to transmitting the RRC connection reconfiguration message to the UE 300.

The master node 100 transmits (708) the secondary node modification confirm message to the secondary node 200. In FIG. 7, it should be noted that the secondary node 200 receives the secondary node modification confirm message from the master node 100 without coordination of a secondary node modification request message and a secondary node modification request acknowledgement message with the master node 100.

Further, the UE 300 performs (710) random access procedure with the secondary node 200.

FIG. 8 illustrates scenarios in which the secondary node 200 coordinates with the master node 100, according to an embodiment as disclosed herein. In LTE/NR interworking systems, the secondary node 200 send the messages to the UE 300 without any coordination with the master node 100. However, in some scenarios, the secondary node 200 needs to coordinate with the master node 100 MN before sending message to UE 300.

As depicted in the FIG. 8, the secondary node 200 coordinates with the master node 100 for of measurement configuration of the UE (band), layer 2 (L2) buffer configuration, mobility for secondary node cells, radio resource configuration for secondary node and UE capability information.

Coordination Between Master Node 100 and Secondary Node 200:

The UE 300 can be configured to establish an SRB in SCG to enable RRC PDUs for the secondary node 200 to be sent directly between the UE 300 and the secondary node 200. The RRC PDUs for the secondary node 200 can be transported directly to the UE 300 for the secondary node RRC reconfiguration not requiring any coordination with the master node 100

Alternatively, it can be delivered within RRC PDUs generated by the master node, based on network implementation. The master node 100 and the secondary node 200 coordinate with each other in case UE capability coordination is required, due to secondary node cell reconfiguration. In this scenario, for example, the master node 100 and the secondary node 200 can be LTE/NR node or NR/NR node or NR/LTE node.

Further, the master node 100 and the secondary node 200 coordination is required if there is addition of a new configuration or a change in the UE configuration related to UE capability. In all other scenarios, there is no need of any coordination between the master node 100 and the secondary node 200. When configuring or reconfiguring secondary node cells, the secondary node and master node should coordinate with each other for measurement's, band configuration, radio resource configuration, L2 buffer status and other parameters required for UE capability coordination between the two nodes.

In 3GPP, the various possible options for Function Split between central unit (CU) and distributed unit (DU) are captured in TR 38.801. The 3GPP has selected Option 2 (based on centralized PDCP/RRC and decentralized RLC/MAC/PHY) for normative work in Release 15 for CU-DU split architecture.

Based on this split option and different type of possible mobility, embodiments herein will further discuss the impacts on control and data plane procedure due to intra and inter CU handover cases. As mentioned above there are generally four types of mobility based on different deployment of centralized architecture.

Different Types of Intra CU HO and Impact on Control and Data Plane

All intra CU HO mobility procedures do not require RRC messages. Due to split of protocol between CU and DU entity, procedures have been introduced for NR like the handover with and without re-establishing the PDCP entity. In case there is no change in keys and PDCP location is not changed which is possible in intra CU HO, there is no need to do PDCP re-establishment. The same is applicable for RLC and MAC entity, in case there is no change in RLC and MAC entity there is no need of RLC and MAC re-establishment and reset procedure. The handover mechanism driven by RRC requires the UE at least to reset the MAC entity if multi-connectivity is not configured for the UE. For mobility without RRC, it is dealt with PHY and/or MAC on the beam or TRxP level. As such, intra-cell mobility can be handled by mobility without RRC. One gNB corresponds to one or many TRxPs Table 1 has the summary of different possible mobility options in NR Centralized deployment and their possible impact on L2 entities i.e. PDCP/RLC/MAC and also need of RRC messages to support the mobility procedure.

TABLE 1

| Type of mobility | Type of Change | PDCP | RLC | MAC | Need of RRC message |
|---|---|---|---|---|---|
| Inter - CU HO | CU change | Re-establishment | Re-establishment | Reset | Yes |
| Intra CU-Inter DU HO | DU change | No Impact | Re-establishment | Reset | Yes |
| Intra DU-Inter TRP | TRP change(Beam change) | No Impact | No Impact | No Impact | No |
| Intra DU-intra TRP | Beam change | No Impact | No Impact | No Impact | No |

As listed in table 1, few of mobility procedure does not require any RRC message as UE based on its internal measurement can take a call to change the beam or TRP. This type of mobility does not have any impact on existing L2 entities as a result there is no need of RRC involvement in such cases. In few type of mobility like Inter-CU HO, Intra CU-Inter DU HO where the location of CU or DU changes i.e., end point of PDCP/RLC/MAC changes, the UE cannot do handover of its own and it needs the RRC message to support the same. This type of mobility procedure has impact on layer 2 entities or may be some impact on configuration. Also the Network (NW) needs to be involved for the same.

The mobility procedures which requires RRC message in that case there is a possibility that PDCP, RLC, MAC end point of location changes at NW side based on type of handover procedure like inter CU or intra CU-inter DU. Once location of layer 2 entities i.e. PDCP/RLC/MAC changes, there is a need to reset or re-establishment of layer 2 entities both at UE and NW. In case layer 2 entities i.e. PDCP/RLC/MAC location does not change, there is no need to reset or re-establishment of layer 2 entities both at the UE and the NW. As per function Split between central unit (CU) and distributed unit (DU), the centralized unit comprises of PDCP and RRC layer and the decentralized unit comprises of RLC/MAC/PHY layer. There are mobility types where reset or re-establishment is needed for PDCP/RLC/MAC entity and in other mobility types only RLC and MAC re-establishment and reset is required. In certain types of mobility like Intra DU-Inter TRP, Intra DU-intra TRP (where there is no involvement of RRC), there is no impact on layer2 entities i.e. PDCP/RLC/MAC. There may be possible impact on MAC entity due to beam change or TRP change, in that case the MAC entity may need to be reset.

In existing systems, during handover procedure all the Layer2 entities i.e. PDCP/RLC/MAC are either re-established or reset. So only handover indicator is enough for the UE to complete the HO procedure. In case of NR reset or re-establishment of layer2 entities depending on type of mobility, it is important for the UE to determine which layer2 entity needs to be reset or re-established.

During Intra CU-inter DU HO case as mentioned in Table 1, there is no need of PDCP re-establishment as PDCP does not change, but it is required to perform re-establishment and reset for RLC and MAC entity as RLC and MAC entity at the NW side change. In this case, the UE needs to determine that only RLC and MAC reset/re-establishment is needed and there is no need to do PDCP re-establishment. Embodiments herein need to define new mechanisms in NR through which UE can determine when it receives HO command, which all layer2 entity will be impacted. Currently no such mechanism is defined through which UE can determine whether some or all layer2 or layer1 needs reset or re-establishment. In prior art, on receiving handover command all entities like PDCP/RLC/MAC/Phy are reset or re-established. In this invention we propose various mechanisms through which UE can determine the desired action on layer 2 and layer 1 entities.

The base station can send an indication to the UE 300 for each mobility procedure, which ensures that UE 300 only resets or re-establishes the PDCP, RLC and MAC when required. The base station sends these indications based on type of mobility as listed above in Table 1. During intra CU-inter DU HO case; PDCP is not changed so there is no need to do PDCP re-establishment. The NW can set the parameter, which indicates that PDCP entity need not be re-established for this handover. Based on this indication, the UE can take appropriate action on different layer2 entities. As the UE cannot make out of its own type of mobility i.e. intra/Inter CU or intra/Inter DU HO, these indications will help the UE to take appropriate action.

These indications are provided in RRC reconfiguration message. These indications can be like resetpdcp, resetrlc or keeppdcpconfig, intracuho, interduho and so on. All these indications inform the UE about the action that it needs to take on layer2 entities. These parameters will indicate whether the UE needs to reset/re-establish the layer2 entities or not. These parameters can be optional or mandatory. The NW can set these parameters, if there is no need of layer2 entities like PDCP/RLC/MAC reset or re-establishment. Alternatively if these parameters are not present during handover procedure, the UE can follow the legacy behavior like re-establish and reset all layer2 entities.

These parameters can be exchanged between different NW nodes like X2, Xw, Xn, etc., which indicates to the UE whether reset or re-establishment of different layer2 entities are required or not. These indications can be shared between master node and secondary node or between source node and target node or between source DU and target DU or between source CU and target CU through modification procedure like SeNB Modification Request message or any other message exchange between two nodes or SeNB Release Request or handover request or handover request ACK. The secondary node change procedure can happen with or without PDCP re-establishment procedure. In this case secondary node has to indicate the master node about the type of secondary node change procedure. In MR-DC, a PSCell change does not always require a security key change. When there is need to perform the Pscell change procedure with security key change procedure then it has to inform the same to master node so that it can generate the new security keys for secondary node. The Pscell change which does not require security key update procedure, there is need to perform PDCP data recovery procedure for MN terminated split bearers or SCG bearers. The reason is RLC entity corresponding to SCG entity will still be re-established so it is required to perform PDCP data recovery procedure. The secondary node can send these indications in SGNB MODIFICATION REQUIRED where it can mention whether master node 100 need to either initiate the security key update or to perform PDCP data recovery towards the UE. The NW can share the same indication to UE through any RRC message.

The NW can also choose to use the security parameters to indicate to the UE whether PDCP entity needs to be re-established or not. In LTE, the NW shares security parameters during handover procedure, which can be due to cell change, or when keys refresh happens. In NR, the NW can also share these security parameters during handover procedure or when keys refresh happens. Once the UE 300 receives security parameters, it can further detect whether PDCP needs to be re-established or not. These security parameters can be nextHopChainingCount (NCC), security configuration or some new security parameters (such as PDCP counter).

The various ways through which UE can detect whether need of PDCP is re-established or not is listed below:

In case PDCP counter value stored in the UE is the same as the new PDCP counter value, which is shared in RRC reconfiguration message, then the UE can understand that there is no need to do PDCP re-establishment and only RLC/MAC re-establishment is needed. PDCP counter parameter is just an example. The device can use any security parameter for detection.

Currently security parameters are always present during handover procedure. In case, the NW triggers handover procedure, but no security parameters are present, then the UE can detect that there is no change in PDCP and there is no need to do re-establishment procedure.

These same parameters can be used to detect whether there is any change in RLC/MAC or not.

Another way is NW can send identifiers related to DU like D-RNTI and CU, for example CU-RNTI. These parameters will only change when DU/CU entity will change. Once the UE finds out whether there is any change in DU/CU or not, it can decide whether it needs to reset or re-establish the PDCP entity or not. In case, the identifier received in the RRC message is different from one that the UE has stored, the UE will understand that DU/CU has changed so it will reset/re-establish the PDCP, RLC and MAC entities. In this case there is no change in DU/CU entity then there is no need to reset/re-establish the PDCP, RLC and MAC entities. Similarly in case, the CU identifier does not change, but the DU identifier has changed then the UE will only reset/re-establish the RLC and MAC entities and does not re-establish the PDCP entity. These identifiers can come in any RRC message like RRC reconfiguration message or System information and so on.

UE Initiated Handover for Intra CU HO

All above listed handovers as mentioned in table 1 are not possible for UE initiated handover. The UE initiated handover is handover where based on certain signal conditions, the UE decides to trigger UE based handover. These handovers can be of any type. In case there is only beam change or TRP change which does not have much impact on layer2 entities, the UE can directly inform the NW entity about the handover procedure for synchronization between UE and NW. The UE can send any existing or new RRC message or L2/L1 indication to inform the beam or TRP change to the NW.

In case, the UE finds that the layer2 entities are getting impacted. Detection of the impact on the layer2 entities can be done based on identifier of CU, DU and TRP, which the UE receives in system information or any other RRC message. Once the UE detects that there is an impact on layer2 entities then it has to properly synchronize with the NW by initiating RRC re-establishment procedure or be sending any other RRC message. In case there is no change in L2 entity, then the UE can simply send an indication to the NW about the UE based HO. Another option in case, the UE based on CU/DU identifier identifies that any particular layer 2 entity needs to be reset or re-establish, the UE can take appropriate action and inform the NW through RRC message. It can set the indications for layer 2 entities, which can be impacted due to this.

PDCP Data Recovery Procedure in NR:

The PDCP data recovery procedure is introduced in LTE for LTE DC and LWA procedure. This procedure is triggered when for specific radio bearer PDCP entity is not re-established, but the RLC entity associated with this PDCP entity is re-established or released. This can happen during LWA to LTE, only DRB change or when SCG RLC entity for MCG split DRB is re-established due to SN change. In all these cases, there is no change in the PDCP entity, but the corresponding RLC entity is re-established or released. Due to re-establishment or release of RLC entity, the data will be lost; PDCP data recovery is introduced to recover this lost data. PDCP data recovery procedure is initiated when the PDCP entity is not re-established, but the RLC entity associated with this PDCP entity is re-established or released.

During PDCP data recovery procedure for a radio bearer, the UE shall:

Compile a status report and send it to the NW, if the radio bearer is configured by upper layers to send a PDCP status report in the uplink.

Perform retransmission of all the PDCP PDUs previously submitted to re-established AM RLC entity in ascending order of the associated COUNT values from the first PDCP PDU for which the successful delivery has not been confirmed by lower layers.

In NR for every mobility procedure, the PDCP entity will not be re-established. There are few mobility procedures as mentioned in Table 1 that does not require PDCP re-establishment, but there is a need to do re-establishment/reset for the RLC and MAC entities. For MCG split DRB, PDCP data recovery procedure is defined in LTE and the same can be adopted for NR. In LTE, the UE performs "PDCP re-establishment" (not "PDCP data recovery") for SCG bearers as the PDCP entity will be always re-established. But this will not be true for NR as the handover with and without re-establishing the PDCP entity is supported. There may be cases during SN change or modification, where there is no need to do re-establishment for PDCP entity, but RLC/MAC need to be reset and re-established.

In case, the RLC and MAC entity associated with SCG DRB are only reset/re-established, but did not re-establish the PDCP entity then there is no way to recover the lost data which was lost due to SCG RLC re-establishment procedure. RLC re-establishment includes state variable and timer reset, SDU segment discard and so on.

There is a need to introduce the PDCP data recovery procedure for the SCG DRB. In case, the RLC entity associated with SCG DRB is re-established, but PDCP entity is not re-established, then the UE and the NW should perform PDCP data recovery procedure.

Split bearer via the SCG is a bearer type related to dual connectivity between LTE and NR. In this case, if the UE and the NW do reset/re-establish the RLC and MAC entity associated with SCG split DRB, but did not re-establish the PDCP entity then the UE and the NW needs to perform PDCP data recovery procedure to recovery lost data due to reset/re-establishment of the RLC and MAC entities.

PDCP data recovery procedure should be performed for SCG DRB and SCG split DRB, if RLC entities associated with these DRBs are re-established without PDCP re-establishment.

In standalone procedure of NR, if any handover occurs in case only the RLC and MAC entity associated with AM DRB are reset/re-established, but did not re-establish the PDCP entity, then there is no way to recover lost data which happened due to RLC re-establishment procedure for that AM DRB. There is a need to introduce the PDCP data recovery procedure for the AM DRB. In case, the RLC entity associated with AM DRB is re-established, but PDCP entity is not re-established, then the UE and the NW should perform PDCP data recovery procedure. In this case, the UE, if configured, should send the status report and perform retransmission of all the PDCP PDUs previously submitted to re-established AM RLC entity in ascending order of the associated COUNT values from the first PDCP PDU for which the successful delivery has not been confirmed by lower layers.

Impacts on Signaling Procedure for Intra-CU Based Handover:

Intra CU handover can occur for 5G standalone system or during Non-standalone system i.e. during LTE-NR interworking or during NR-NR DC. All the embodiments defined here are applicable for all these system. Master node and secondary node can be any of below listed combination.

MN is LTE and SN is NR
MN is NR and SN is LTE
MN is NR and SN is NR

The embodiments are explained here are applicable for all the above listed combinations. Procedures have been explained by considering few combinations.

The secondary node 200 (i.e., SgNB) decides for intra CU HO based on MRM etc. Step 8 is optional and is required if MCG split DRB is configured as PDCP is with the master node (i.e., MeNB) 100. This is for PDCP data recovery. As mentioned above, during intra CU HO there is no need of PDCP re-establishment until security keys changed, so the UE 300 and network needs to PDCP recovery procedure as RLC/MAC entity may have change due to inter DU HO. In this case, MeNB 100 does not know about modification procedure, so on getting the SgNB Modification indication or any other messages, MeNB or MgNB should start the PDCP data recovery procedure.

FIG. 9 illustrates various hardware components of a User Equipment (UE) 300 for handling packet data convergence protocol (PDCP) re-establishment during a handover, according to an embodiment as disclosed herein. As depicted in the FIG. 9, the UE 300 includes a communicator 302, a stack coordinator 304, a processor 306 and a memory 308.

The communicator 302 can be configured to transmit or receive one or more signaling messages from the base station (for example, a 5G base station).

In an embodiment, the stack coordinator 304 can be configured to perform one or more actions on stack of the UE 300 which includes various entities such as PDCP entity, RLC entity, MAC entity and so on.

In an embodiment, the stack coordinator 304 receives the RRC connection reconfiguration message from the master node 100 with an Information Element (IE). The stack coordinator 304 re-establishes the PDCP entity or performs PDCP data recovery based on the IE received from the master node 100. In some embodiments, the IE indicates to perform security key update for the secondary node key or to perform the PDCP data recovery procedure.

In an embodiment, the IE is set as security key update required if secondary node key update is required and stack coordinator re-establishes the PDCP entity.

In another embodiment, the IE is set as PDCP data recovery if secondary node key update is not required and master node need to perform the PDCP data recovery procedure for Master node terminated bearers which includes MCG bearer, SCG bearers and split bearers.

In an embodiment, the processor 306 (for example; a hardware unit, an apparatus, a Central Processing Unit (CPU), a Graphics Processing Unit (GPU), etc.,) communicatively coupled to a memory 308 (e.g., a volatile memory and/or a non-volatile memory); the memory 308 includes storage locations configured to be addressable through the processor 306.

In an embodiment, the memory 308 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 308 may, in some examples, be considered a non-transitory storage medium. The term "non-transitory" may indicate that the storage medium is not embodied in a carrier wave or a propagated signal. However, the term "non-transitory" should not be interpreted that the memory 308 is non-movable. In some examples, the memory 308 can be configured to store larger amounts of information than the memory. In certain examples, a non-transitory storage medium may store data that can, over time, change (e.g., in Random Access Memory (RAM) or cache).

FIG. 10 is a flow chart 1000 illustrating a method for handling packet data convergence protocol (PDCP) re-establishment during a handover by the UE, according to an embodiment as disclosed herein. The various steps of the flow chart 1000 are performed by stack coordinator 304.

At step 1002, the method includes receiving a RRC connection reconfiguration message including an indication from a master node 100.

At step 1004, the method includes re-establishing a PDCP entity based on the indication in the RRC connection reconfiguration message.

FIG. 11 is a flow chart 1100 illustrating a method for reestablishing the PDCP entity based on an Information Element (IE) received in a RRC message from a master node, according to an embodiment as disclosed herein. The various steps of the flow chart 1000 are performed by stack coordinator 304. At step 1102, the method includes receiving a RRC connection reconfiguration message from the master node with an Information Element (IE). The IE indicates to perform security key update for secondary node key or to perform the PDCP data recovery procedure.

At step 1104, the method includes reestablishing the PDCP entity or performing PDCP data recovery based on the IE.

FIG. 12 is a flow chart 1200 illustrating a method for performing security key update for secondary node key, according to an embodiment as disclosed herein. The various steps of the flow chart 1000 are performed by stack coordinator 304.

At step 1202, the method includes receiving a RRC connection reconfiguration message from a master node 100 with an IE. The IE indicates to either perform security key update for secondary node key or perform the PDCP data recovery procedure.

In an embodiment, the master node 100 receives a secondary node modification request message with the IE from the secondary node 200. The IE indicates to perform security key update for secondary node key or to perform the PDCP data recovery procedure. In an embodiment, the IE is set as security key update required if secondary node key update is required.

In some embodiments, the IE is set as PDCP data recovery if secondary node key update is not required. The master node 100 needs to perform the PDCP data recovery procedure for the master node terminated bearers, which include MCG bearer, SCG bearers and split bearers.

At step 1204, the method includes performing security key update for secondary node key which further requires PDCP re-establishment procedure or performing the PDCP data recovery procedure based on the IE.

FIG. 13 is a flow chart 1300 illustrating a method for performing security key update for secondary node key or to perform the PDCP data recovery procedure for master node terminating bearers, according to an embodiment as disclosed herein. The various steps of the flow chart 1300 are performed by RRC coordinator 204.

At step 1302, the method includes receiving a SgNB modification required message from a secondary node 200 with an IE. The IE indicates to either perform security key update for secondary node key or perform the PDCP data recovery procedure for master node 100 terminated bearers.

In an embodiment, the master node 100 receives a secondary node modification request message with the IE from the secondary node 200. The IE indicates to perform security key update for secondary node key or to perform the PDCP data recovery procedure. In an embodiment, the IE is set as security key update required if secondary node key update is required.

In some embodiments, the IE is set as PDCP data recovery if secondary node key update is not required. The master node 100 needs to perform the PDCP data recovery procedure for the master node terminated bearers, which include MCG bearer, SCG bearers and split bearers.

At step 1304, the method includes performing security key update for secondary node key which further requires PDCP re-establishment procedure or informing the secondary node with new set of keys or performing the PDCP data recovery procedure for MN terminated bearers based on the IE. This IE can be name as "secondary node change" IE or PDCP change IE or PDCP action IE.

Dual Connectivity with the EPC or Next Gen Core:

In dual connectivity with EPC where LTE and NR connected to the EPC or dual connectivity with next gen core where LTE and NR connected to the next gen core, even LTE system can adopt the same rules as mentioned for NR i.e. In case PDCP location or end point does not change, there is no need to do PDCP, RLC and MAC reset or re-establishment procedure during each handover procedure. This will help to reduce the user plane interruption time during HO. The embodiments mentioned in this invention will be applicable for LTE system also.

In LTE-NR interworking, Inter MeNB handover can happen without SN node change. There may be certain deployments where NR coverage area spans across the overlapping area of adjacent eNBs. In such cases there is no need to change NR node while MeNB handover takes place. In LTE DC during inter MeNB handover without SeNB change, source eNB transfer context data to target eNB. The target eNB may decide to keep the UE context of SeNB in case there is no change in SeNB configuration and indicate the same to source eNB by including the UE Context Kept Indicator IE set to "True" in the HANDOVER REQUEST ACKNOWLEDGE message as mentioned in 3GPP TS 36.423[2]. The SeNB may receive the SENB RELEASE REQUEST message including the UE Context Kept Indicator IE set to "True", upon which the SeNB shall, if supported, only release the resources related to the UE-associated signaling connection between the MeNB and the SeNB. In this case as there is no need to release and again add the context for SeNB as a result NW will not send any configuration to UE to release the SeNB during MeNB handover and then again add the SeNB configuration. This will help to reduce the service interruption time and signaling overhead.

In eLWA mobility, Inter-eNB handover without WT change is used to transfer context data from a source eNB to a target eNB while the LWA connectivity is kept. There are new handover (HO) optimizations introduced in LTE Rel-14 where if there is no change in WT entity, then NW will not release the configuration of WT and retain the same configuration while doing MeNB HO. The new IE WT UE Context Kept Indicator [2] is introduced between NW nodes, which indicates whether the UE retains the LWA configuration during handover or not. If this indication is set then NW will not send any release/addition for the same WT node to the UE. This will help to reduce the service interruption time and signaling overhead.

For LTE NR interworking, in case inter MeNB is changing without SgNB change then it makes more sense to adopt the LTE rel-14 Mobility enhancements of eLWA or LTE DC where SgNB configuration will not be release and added for same SgNB Node. NW can send signaling to the UE, which indicates that UE can retain the SgNB configuration, or not. This will help the UE to avoid release and addition of same SgNB configuration. In case there is any change in SgNB configuration due to Inter MeNB handover then NW can always send SgNB release and addition indication as it is doing for LTE DC.NW can send the indicators like "keep-sgNBconfig" or handover without SgNB change. These indicators will indicate that there is no need to change the NR configuration and UE can keep continue using the same after handover procedure. FIG. 9 depicts the signaling procedure between MN and SN for Inter-MeNB handover without SeNB. In the uplink, the UE inserts end marker packets to indicate the key switch. The source eNB may use the end marker packets to infer which packets it should process or discard while the source X2 or Xx or Xn tunnel is operational. The target eNB processes all received packets. In the downlink, the source eNB forwards end marker packets immediately after the last data packets sent to the SgNB for a particular bearer, and the SgNB forwards packets received from either eNB towards the UE. The end marker packets may be used by the UE to switch the PDCP key.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for coordination of Radio Resource Control (RRC) configurations between interworking nodes in dual connectivity in a wireless communication system, the method comprising:
   determining, by a secondary node, whether a signaling radio bearer (SRB) of a secondary node is pre-configured in a secondary cell group (SCG);
   deciding, by the secondary node, to perform secondary node modification to a user equipment (UE) in response to determining that the SRB of the secondary node is pre-configured;
   transmitting, by the secondary node, a RRC connection reconfiguration message to the UE without coordinating with a master node; and
   receiving, by the secondary node, a RRC connection reconfiguration complete message from the UE.

2. The method of claim 1, wherein the secondary node transmits a secondary node modification required message to a master node and receives a secondary node modification confirm message from the master node in response to determining that the SRB of the secondary node is not pre-configured.

3. The method of claim 2, wherein the secondary node receives the secondary node modification confirm message from the master node, without coordination of a secondary node modification request message and a secondary node modification request acknowledgement message with the master node.

4. The method of claim 3, wherein the secondary node receives the secondary node modification confirm message from the master node, without coordination of a secondary node modification request message and a secondary node modification request acknowledgement message with the master node.

5. The method of claim 1, wherein the secondary node transmits a secondary node modification required message to a master node and receives a secondary node modification confirm message from the master node in response to determining that coordination is required with master node, and
   wherein the secondary node coordinates with the master node for at least one of measurement configuration of the UE, band combination layer 2 (L2) buffer configuration and UE capability information.

6. The method of claim 5, wherein the UE receives the RRC connection reconfiguration message from the master node with an Information Element (IE), and
   wherein the UE performs one of re-establishing a PDCP entity and PDCP data recovery based on the IE.

7. The method of claim 6, wherein the master node receives a secondary node modification request message with the IE from the secondary node, and
   wherein the IE indicates to perform one of:
      a security key update for secondary node key, and
      the PDCP data recovery.

8. The method of claim 7, wherein the IE is set as security key update required when secondary node key update is required, and
   wherein the UE re-establishes the PDCP entity.

9. A Radio Access Network (RAN) node for coordination of Radio Resource Control (RRC) configurations in dual connectivity in a wireless communication system, the RAN node comprising:
   a Radio Resource Control (RRC) coordinator configured to:
      determine whether a signaling radio bearer (SRB) of a secondary node is pre-configured in a secondary cell group (SCG);
      decide to perform secondary node modification to a user equipment (UE) in response to determining that the SRB of the secondary node is pre-configured;
      transmit a RRC connection reconfiguration message to the UE without coordinating with a master node; and
      receive a RRC connection reconfiguration complete message from the UE.

10. The RAN node of claim 9, wherein, in response to determining that the SRB of the secondary node is not pre-configured, the RRC coordinator is configured to:
    transmit a secondary node modification required message to a master node; and
    receive a secondary node modification confirm message from the master node.

11. The RAN node of claim 10, wherein the RRC coordinator is configured to receive the secondary node modification confirm message from the master node, without coordination of a secondary node modification request message and a secondary node modification request acknowledgement message with the master node.

12. The RAN node of claim 11, wherein the RRC coordinator is configured to receive the secondary node modification confirm message from the master node, without coordination of a secondary node modification request message and a secondary node modification request acknowledgement message with the master node.

13. The RAN node of claim 10,
    wherein, in response to determining that coordination is required with master node, the RRC coordinator is configured to:
       transmit a secondary node modification required message to a master node, and
       receive a secondary node modification confirm message from the master node, and
    wherein the RRC coordinator is configured to coordinate with the master node for at least one of measurement configuration of the UE, band combination layer 2 (L2) buffer configuration, and UE capability information.

* * * * *